United States Patent
Lichtenau et al.

(10) Patent No.: US 12,399,743 B2
(45) Date of Patent: Aug. 26, 2025

(54) PADDING INPUT DATA FOR ARTIFICIAL INTELLIGENCE ACCELERATORS

(71) Applicant: International Business Machines Corporation, Armonk, NY (US)

(72) Inventors: Cedric Lichtenau, Stuttgart (DE); Vijayalakshmi Srinivasan, New York, NY (US); Sunil K Shukla, Scarsdale, NY (US); Swagath Venkataramani, White Plains, NY (US); Kailash Gopalakrishnan, New York, NY (US); Holger Horbach, Aidlingen (DE); Razvan Peter Figuli, Remchingen (DE); Wei Wang, Yorktown Heights, NY (US); Yulong Li, Hartsdale, NY (US); Martin A Lutz, Peekskill, NY (US)

(73) Assignee: International Business Machines Corporation, Armonk, NY (US)

( * ) Notice: Subject to any disclaimer, the term of this patent is extended or adjusted under 35 U.S.C. 154(b) by 695 days.

(21) Appl. No.: 17/652,109

(22) Filed: Feb. 23, 2022

(65) Prior Publication Data
US 2023/0267003 A1    Aug. 24, 2023

(51) Int. Cl.
*G06F 9/50* (2006.01)
*G06F 9/38* (2018.01)

(52) U.S. Cl.
CPC .......... *G06F 9/5016* (2013.01); *G06F 9/3887* (2013.01)

(58) Field of Classification Search
CPC .......................... G06F 9/3887; G06F 9/30043
See application file for complete search history.

(56) References Cited

U.S. PATENT DOCUMENTS

| | | |
|---|---|---|
| 12,198,221 B2 | 1/2025 | Surti et al. |
| 12,206,552 B2 | 1/2025 | Guim Bernat et al. |
| (Continued) | | |

FOREIGN PATENT DOCUMENTS

| | | |
|---|---|---|
| CN | 1501259 A | 6/2004 |
| CN | 107924291 A | 4/2018 |
| (Continued) | | |

OTHER PUBLICATIONS

Anonymous. ""RDNA 2" Instruction Set Architecture." Published Nov. 30, 20 by AMD. 291 pages. https://developer.amd.com/wp-content/resources/RDNA2_Shader_ISA_November2020.pdf.

(Continued)

*Primary Examiner* — Michael J Metzger
(74) *Attorney, Agent, or Firm* — Stephen R. Yoder

(57) ABSTRACT

Processing input data for transmittal to a data consumer such as an artificial intelligence engine is performed by arranging the input data into a uniform structure made up of sticks of data combined to form pages of sticks. A stick is any well-sized set of input data elements whereby the size of the stick is fixed. A masking pattern is established for sticks of data having certain ranges of invalid data for consumption of partial sticks while maintaining validity of the input data being transferred. The mask pattern is derived based on set-active-mask-and-value (SAMV) instructions. The derived mask pattern is carried forward for subsequent load instructions to the data consumer.

24 Claims, 6 Drawing Sheets

(56) References Cited

U.S. PATENT DOCUMENTS

| | | | |
|---|---|---|---|
| 2002/0010793 A1* | 1/2002 | Noll | H04L 49/90 |
| | | | 709/240 |
| 2017/0139709 A1 | 5/2017 | Gschwind | |
| 2018/0088853 A1 | 3/2018 | Kotra et al. | |
| 2018/0165574 A1 | 6/2018 | Young | |
| 2019/0042250 A1 | 2/2019 | Anders | |
| 2019/0079768 A1 | 3/2019 | Heinecke | |
| 2020/0005128 A1 | 1/2020 | Temam | |
| 2020/0081744 A1 | 3/2020 | Siegl | |
| 2020/0104691 A1 | 4/2020 | Bai | |
| 2021/0065005 A1 | 3/2021 | Zhu | |
| 2021/0182059 A1 | 6/2021 | Akin | |
| 2021/0192359 A1 | 6/2021 | Khish Ardestani Zadeh | |
| 2021/0224125 A1 | 7/2021 | Liu | |
| 2021/0264250 A1 | 8/2021 | Singh | |
| 2022/0027546 A1* | 1/2022 | Ren | G06N 3/126 |
| 2024/0135158 A1 | 4/2024 | Heyne et al. | |

FOREIGN PATENT DOCUMENTS

| | | | |
|---|---|---|---|
| CN | 113383309 A | 9/2021 | |
| CN | 113836049 A | 12/2021 | |
| CN | 119013653 A | 11/2024 | |
| DE | 112023001068 T5 | 1/2025 | |
| GB | 2630701 A | 12/2024 | |
| WO | 2021119907 A1 | 6/2021 | |
| WO | 2023/161783 A1 | 8/2023 | |

OTHER PUBLICATIONS

Anonymous. "Parallel Thread Execution ISA." Published Oct. 22 by NVIDIA. 516 pages. https://docs.nvidia.com/cuda/parallel-thread-execution/index.html#texture-instructions-tld4.

Anonymous. "Unit Description." Printed Oct. 13, 2021. 43 pages. Published by NVDLA. <http://nvdla.org/hw/v1/ias/unit_description.html>.

Dave, et al., "Hardware Acceleration of Sparse and Irregular Tensor Computations of ML Models: A Survey and Insights." Last edited Jul. 22, 2021. 44 pages. Published by ARXIV. https://arxiv.org/abs/2007.00864v2.

Heyne et al., "Processing Tensors", U.S. Appl. No. 18/046,322, filed Oct. 13, 2022, 47 pages.

IBM Appendix P, "List of patents and patent applications to be treated as related", Filed Oct. 14, 2022, 2 pages.

"Patent Cooperation Treaty PCT International Search Report", International application No. PCT/IB2023/051533, International filing date Feb. 20, 2023, Date of mailing Jun. 19, 2023, 6 pages.

Adiono et al., "Low Latency YOLOv3—Tiny Accelerator for Low-Cost FPGA Using General Matrix Multiplication Principle", IEEE Access, date of current version Oct. 25, 2021, 24 pages.

Authors et al.: Disclosed Without Attribution. "System for Managing a Container Based Resource Pool for On-Demand Usage", IP.com No. IPCOM000262948D, Jul. 16, 2020, 4 pages.

Miller Michael. "Virtual Accelerator Engines", CTO, MoSys, Inc., 2020, 9 pages.

White Paper, "Achieving vMotion Acceleration Over Efficient Virtualized Network (EVN)", Mellanox Technologies, Dec. 2014, 8 pages.

* cited by examiner

PADDING INPUT DATA FOR ARTIFICIAL INTELLIGENCE ACCELERATORS

BACKGROUND

The present invention relates generally to the field of hardware accelerators, and more particularly to accelerating artificial intelligence (AI) and machine learning applications.

An AI accelerator is a class of specialized hardware accelerator designed to accelerate AI and machine learning applications by high-performance parallel computation machines specifically designed for efficient processing of AI workloads such as artificial neural networks and machine learning. Typical applications include algorithms for robotics, internet of things, and other data-intensive or sensor-driven tasks.

Artificial intelligence accelerators typically co-exist in a computing system along with the processor and memory subsystem. They may be integrated on the same chip or attached to the processor system by external I/O interfaces or attached remotely in a cloud computing environment.

SUMMARY

In one aspect of the present invention, a method, a computer program product, and a system for padding data while loading data from a memory to a data consumer includes: receiving a load instruction including a padding instruction, the load instruction including a read instruction to read input data arranged in a stick layout from a memory to a data consumer, the padding instruction including a replacement value for masked elements and padding parameters; deriving a mask pattern from parameters specified in the padding instruction; padding the input data by masking invalid elements of the stick layout; and generating a set of data sticks including the padded data for the data consumer. Applying padding on the fly from the load instruction via a padding instruction has large performance benefit by eliminating any pre-processing steps. The parameters specified in the padding instructions include layout parameters and pad range parameters. The stick layout is separable into a predefined number of slices, and masking the invalid elements includes: identifying invalid slices in a stick, the invalid slices including an invalid element, and determining a starting slice having a portion of valid elements and a portion of invalid elements. The padding instruction provides the specified data format in a 6-bit instruction including data format, cross-slice dimension type, and a key dimension of a stick.

In another aspect of the present invention, a method, a computer program product, and a system for padding data while loading data from a memory to a data consumer includes, responsive to the load instruction, transmitting the set of data sticks to the data consumer.

In yet another aspect of the present invention, a method, a computer program product, and a system for padding data while loading data from a memory to a data consumer includes: decoding the padding instructions to determine the replacement value and the mask pattern.

In still another aspect of the present invention, a method, a computer program product, and a system includes: decoding a padding instruction to determine a replacement pad value and padding parameters of a mask pattern for a set of stickified input data, the padding instruction embedded in a first load instruction for the stickified input data; deriving a mask pattern from the padding parameters; generating a set of data sticks from the set of stickified input data for a requesting consumer, the set of data sticks padded according to the derived mask pattern including the replacement pad value; and applying the derived mask pattern and the associated replacement pad value to a subsequent load instruction to load subsequent input data, the subsequent load instruction equivalent to the first load instruction, the subsequent input data is padded during transmission to a requesting consumer. The set of stickified input data is arranged as sticks, each stick being separable into pre-defined number of slices. The replacement pad value is determined with reference to a pad value register file.

In still yet another aspect of the present invention, a method, a computer program product, and a system includes: padding the set of stickified input data to generate the set of data sticks by masking invalid elements of each stick, the masking invalid elements of a stick including: identifying invalid slices in the stick, the invalid slices including an invalid element, and determining a starting slice having a portion of valid elements and a portion of invalid elements. The set of stickified input data is arranged as sticks, each stick being separable into pre-defined number of slices.

DETAILED DESCRIPTION

Figure 1:
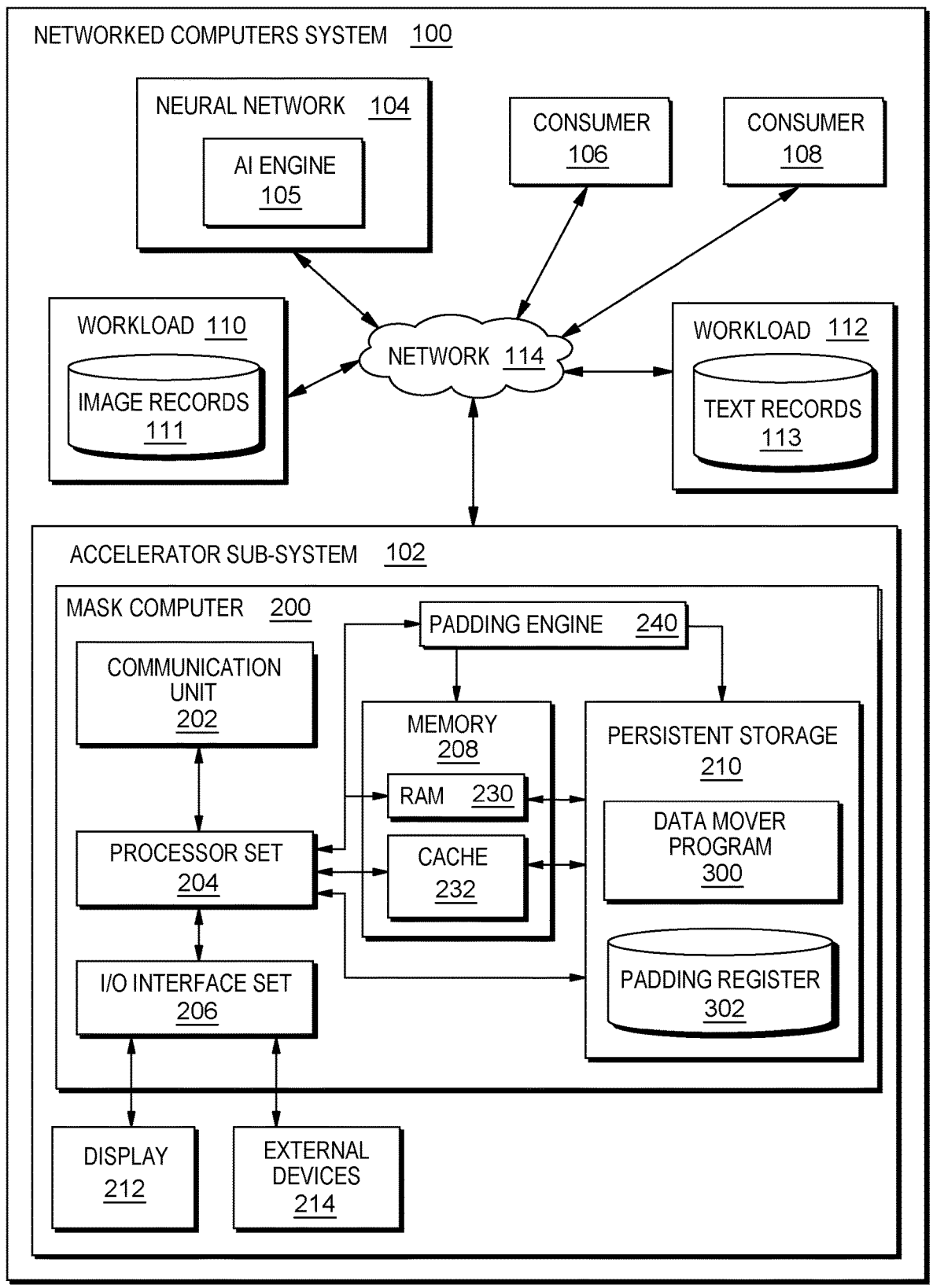
FIG. 1 is a schematic view of a first embodiment of a system according to the present invention.

Processing input data for transmittal to a data consumer such as an artificial intelligence engine is performed by arranging the input data into a uniform structure made up of sticks of data combined to form pages of sticks. A masking pattern is established for sticks of data having certain ranges of invalid data for consumption of partial sticks while maintaining validity of the input data being transferred. The mask pattern is derived based on set-active-mask-and-value (SAMV) instructions. The derived mask pattern is carried forward for subsequent load instructions to the data consumer.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium, or to an external computer or external storage device via a network, for example, the Internet, a local area network, a wide area network, and/or a wireless network. The network may comprise copper transmission cables, optical transmission fibers, wireless transmission, routers, firewalls, switches, gateway computers, and/or edge servers. A network adapter card or network interface in each computing/processing device receives computer readable program instructions from the network, and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer, or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture, including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus, or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The present invention will now be described in detail with reference to the Figures. FIG. 1 is a functional block diagram illustrating various portions of networked computers system 100, in accordance with one embodiment of the present invention, including: accelerator sub-system 102; neural network sub-system 104; artificial intelligence engine 105; data consumer sub-systems 106, 108; workload sub-systems 110, 112; image records 111; text records 113; communication network 114; mask computer 200; communication unit 202; processor set 204; input/output (I/O) interface set 206; memory device 208; persistent storage device 210; display device 212; external device set 214; random access memory (RAM) devices 230; cache memory device 232; padding engine 240; data mover program 300; and padding register 302.

Sub-system 102 is, in many respects, representative of the various computer sub-system(s) in the present invention. Accordingly, several portions of sub-system 102 will now be discussed in the following paragraphs.

Sub-system 102 may be a laptop computer, tablet computer, netbook computer, personal computer (PC), a desktop computer, a personal digital assistant (PDA), a smart phone, or any programmable electronic device capable of communicating with the client sub-systems via network 114. Program 300 is a collection of machine readable instructions and/or data that is used to create, manage, and control certain software functions that will be discussed in detail below.

Sub-system 102 is capable of communicating with other computer sub-systems via network 114. Network 114 can be, for example, a local area network (LAN), a wide area network (WAN) such as the Internet, or a combination of the two, and can include wired, wireless, or fiber optic connections. In general, network 114 can be any combination of connections and protocols that will support communications between server and client sub-systems.

Sub-system 102 is shown as a block diagram with many double arrows. These double arrows (no separate reference numerals) represent a communications fabric, which provides communications between various components of sub-system 102. This communications fabric can be implemented with any architecture designed for passing data and/or control information between processors (such as microprocessors, communications and network processors, etc.), system memory, peripheral devices, and any other hardware component within a system. For example, the communications fabric can be implemented, at least in part, with one or more buses.

Memory 208 and persistent storage 210 are computer readable storage media. In general, memory 208 can include any suitable volatile or non-volatile computer readable storage media. It is further noted that, now and/or in the near future: (i) external device(s) 214 may be able to supply, some or all, memory for sub-system 102; and/or (ii) devices external to sub-system 102 may be able to provide memory for sub-system 102.

Program 300 is stored in persistent storage 210 for access and/or execution by one or more of the respective computer processors 204, usually through one or more memories of memory 208. Persistent storage 210: (i) is at least more persistent than a signal in transit; (ii) stores the program (including its soft logic and/or data), on a tangible medium (such as magnetic or optical domains); and (iii) is substantially less persistent than permanent storage. Alternatively, data storage may be more persistent and/or permanent than the type of storage provided by persistent storage 210.

Program 300 may include both machine readable and performable instructions, and/or substantive data (that is, the type of data stored in a database). In this particular embodiment, persistent storage 210 includes a magnetic hard disk drive. To name some possible variations, persistent storage 210 may include a solid state hard drive, a semiconductor storage device, read-only memory (ROM), erasable programmable read-only memory (EPROM), flash memory, or any other computer readable storage media that is capable of storing program instructions or digital information.

The media used by persistent storage 210 may also be removable. For example, a removable hard drive may be used for persistent storage 210. Other examples include optical and magnetic disks, thumb drives, and smart cards that are inserted into a drive for transfer onto another computer readable storage medium that is also part of persistent storage 210.

Communications unit 202, in these examples, provides for communications with other data processing systems or devices external to sub-system 102. In these examples, communications unit 202 includes one or more network interface cards. Communications unit 202 may provide communications through the use of either, or both, physical and wireless communications links. Any software modules discussed herein may be downloaded to a persistent storage device (such as persistent storage device 210) through a communications unit (such as communications unit 202).

I/O interface set 206 allows for input and output of data with other devices that may be connected locally in data communication with computer 200. For example, I/O interface set 206 provides a connection to external device set 214. External device set 214 will typically include devices such as a keyboard, keypad, a touch screen, and/or some other suitable input device. External device set 214 can also include portable computer readable storage media such as, for example, thumb drives, portable optical or magnetic disks, and memory cards. Software and data used to practice embodiments of the present invention, for example, program 300, can be stored on such portable computer readable storage media. In these embodiments the relevant software may (or may not) be loaded, in whole or in part, onto persistent storage device 210 via I/O interface set 206. I/O interface set 206 also connects in data communication with display device 212.

Display device 212 provides a mechanism to display data to a user and may be, for example, a computer monitor or a smart phone display screen.

The programs described herein are identified based upon the application for which they are implemented in a specific embodiment of the present invention. However, it should be appreciated that any particular program nomenclature herein is used merely for convenience, and thus the present invention should not be limited to use solely in any specific application identified and/or implied by such nomenclature.

Data mover program 300 operates to process input data for transmittal to a data consumer such as an artificial intelligence engine. The input data is arranged in a uniform structure for easy consumption, the structure made up of sticks combined to form pages. Data mover program 300 establishes a masking pattern for sticks of data having certain ranges of data that are invalid. The padding process provides for consumption of partial sticks while maintaining validity of the input data being transferred. The data mover program derives a mask pattern for input data during transfer to a data consumer having a specified load instruction, or loading program, that may include a SAMV instruction to set an active mask and pad value. The derived mask pattern is carried forward for subsequent load instructions to the data consumer.

Some embodiments of the present invention recognize the following facts, potential problems and/or potential areas for improvement with respect to the current state of the art: (i).

One example of standard-length input data is found in high-bandwidth memory (HBM), which can only be addressed in granularity of 128 bytes. Accordingly, a 128-byte sequence of input data would be called a "stick" as the term is used herein. In defining the data layout for each data structure to be configured, certain specific dimension(s) compose the stick. Partitioning a tensor into pages of sticks of data elements is referred to herein as "stickification" or, simply, arrangement of the tensor into sticks of data elements. The term "stick" as used herein may be defined as any well-sized set of input data elements whereby the size of the stick is fixed. According to some embodiments of the present invention, the size of the stick is the SIMD capacity of the accelerator.

If the workload parameters (N) in a given dimension are not a perfect multiple of stick size (S) in that dimension, then a portion of the last stick needs to be padded to fill the empty, or invalid, elements created by the less-than-128-byte input data. The last stick of input data is of interest here because the other sticks in the arrangement of the input data are full sets of valid input data. Some embodiments of the present invention are directed to fast padding of invalid elements in the AI accelerator. As noted, the invalid elements of each input data may be found in the last stick of the sticks containing the input data.

For example, with the number format FP16, the stick dimension for input activations may be selected to be the channel dimension "in." For a stick size of 128 bytes, the stick channel dimension is 64 elements, where each element is 16 bits, totaling 128 bytes for each stick. If the workload parameter N is not a multiple of the stick size, 128 bytes, there will be a remainder when the workload parameter is divided by 128. The remainder indicates how many elements of the last stick should be padded because they will be invalid if not padded. For a given scenario where $N_{in}$ % $S_{in}$>0, the value of 64−($N_{in}$ % $S_{in}$)=PE, where $N_{in}$ is the workload value, $S_{in}$ is the stick size, and PE is the number of padded elements of the final stick making up the workload.

Some embodiments of the present invention are directed to an instruction format to specify a mask pattern and select a pad value from the register file to substitute masked elements within a stick, leaving unmasked elements unchanged. An example of a suitable instruction format is referred to herein as a SAMV (SetActiveMask&Value) instruction. The pad value itself may vary by application specific requirements, but in many cases a pad value of zero is suitable.

Figure 2:
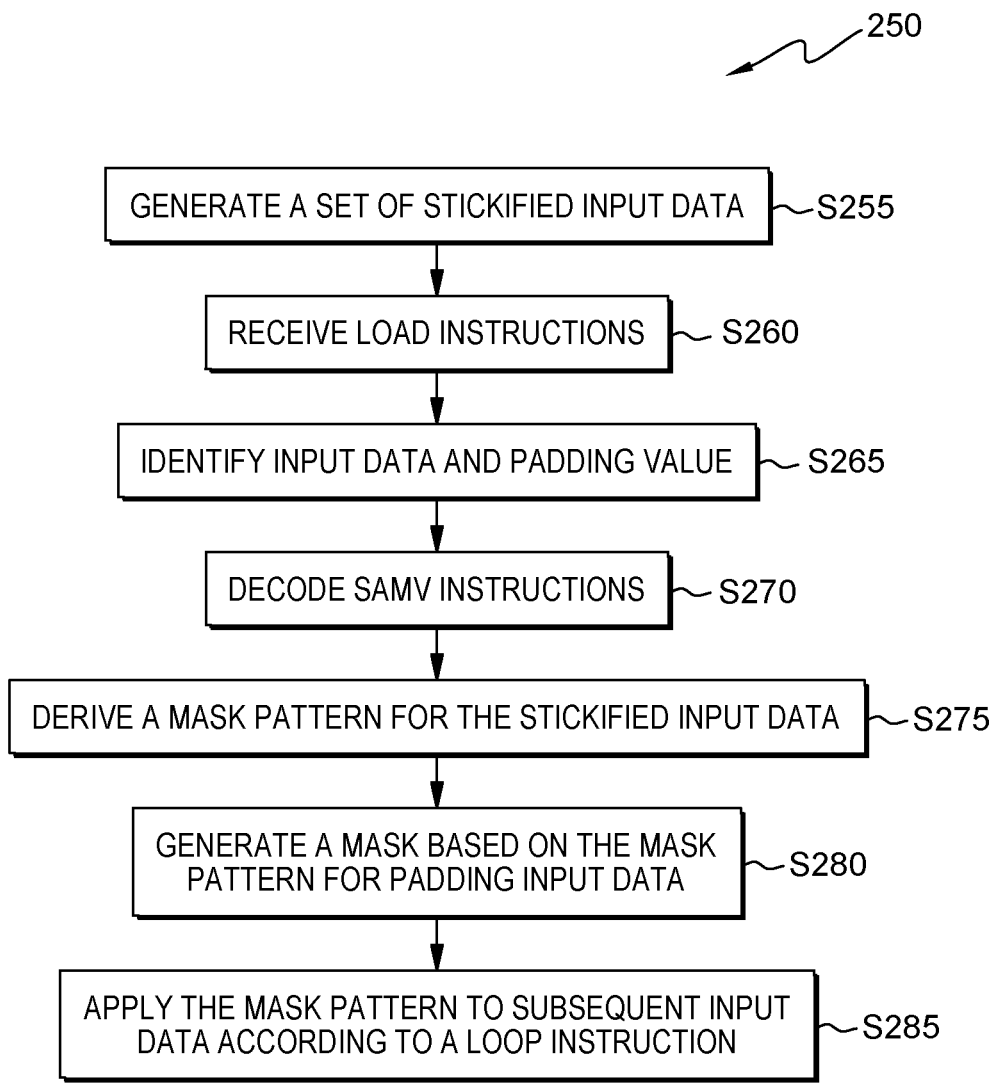
FIG. 2 is a flowchart showing a first method performed, at least in part, by the first embodiment system.
Figure 3:
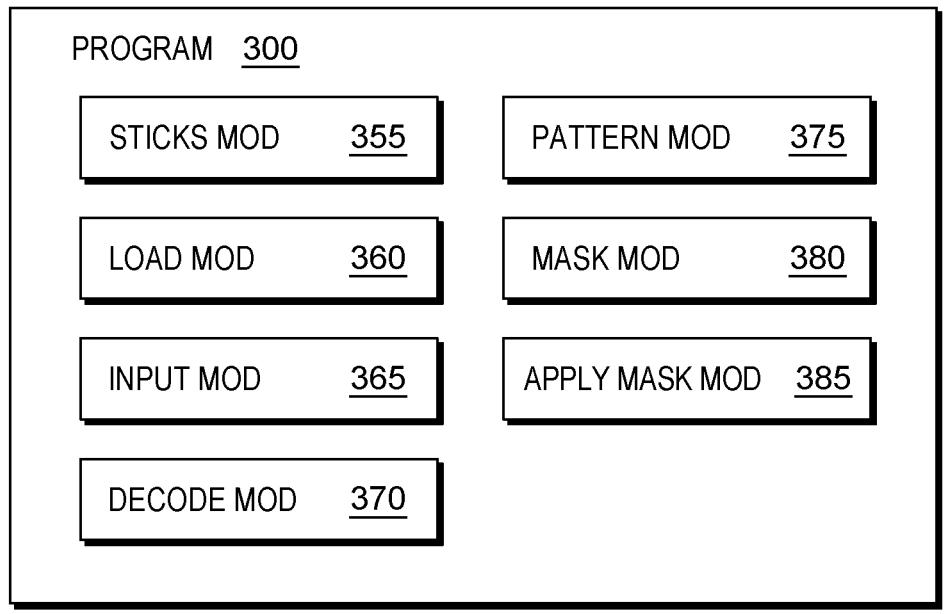
FIG. 3 is a schematic view of a machine logic (for example, software) portion of the first embodiment system.

FIG. 2 shows flowchart 250 depicting a first method according to the present invention. FIG. 3 shows program 300 for performing at least some of the method steps of flowchart 250. This method and associated software will now be discussed, over the course of the following paragraphs, with extensive reference to FIG. 2 (for the method step blocks) and FIG. 3 (for the software blocks).

Processing begins with step S255, where sticks module ("mod") 355 generates input data into sticks of data as a set of stickified input data. The term "sticks" as discussed herein refers to uniform portions of input data organized for accelerated consumption by target applications. As discussed in more detail below, an example stick size is 128 bytes or 64 elements within each stick. The arrangement of input data into sticks of data may be referred to herein as "stickification." A specific process for stickification of input data is provided herein. When sticks of data are formed, oftentimes the input data does not fit exactly into 128 bytes portions, but there are some remaining unused bits in one stick for a given dataset.

Processing proceeds to step S260, where load mod 360 receives load instructions, or program, for loading input data from memory to a data consumer. In this example, input data is loaded from workload sub-system 110 including images from image records store 111 (FIG. 1). Further in this example, load instructions direct transmission of the input data to AI engine 105 of neural network sub-system 104. The load instructions may include: (i) instructions to read data from memory to a consumer; (ii) instructions to copy an intermediate value to the register file; (iii) instructions to "set active mask and value" for padding (a SAMV instruction); and (iv) instructions to loop, or repeat, a series of instructions for a given number of cycles.

Processing proceeds to step S265, where input mod 365 identifies the stickified input data and padding value(s). Upon receipt of the load instructions, data mover program 300 proceeds to locate the input data and assign a padding value. The input data location may be stored at a remote location or on the computer system running the padding program. For the purposes of this disclosure, the input data is to be consumed by a target application such as an AI engine of a neural network or a machine learning application. The padding value(s) relate to the application and provide for masking invalid elements of a required sequence length where the input data does not satisfy the length. In this example, the padding value(s) are recorded to padding register 302 for use in padding the identified input data. The stored padding value(s) are applied later on masked elements.

Processing proceeds to step S270, where decode mod 370 decodes the SAMV instructions. The decoded SAMV instruction initiates reading the padding value from the register and holding the padding value for use. The SAMV instruction further provides for mask pattern operations and generating active masks for the input data read from memory.

Processing proceeds to step S275, where pattern mod 375, derives a mask pattern for the stickified input data. The mask pattern is derived from the layout and pad range parameters encoded within bitfields of the SAMV instruction. The SAMV instruction provides for controlled substitution of pad elements along inner and outer dimensions within the sticks, which may be divided into slices. A detailed discussion of mask pattern derivation is provided below.

Processing proceeds to step S280, where mask mod 380, generates a mask based on the mask pattern for padding the input data. Mask mod 380 operates to generate the mask based on parameters derived from the SAMV instruction. In this example, image records from workload 110 are to be transmitted to AI engine 105. The image records are arranged into stick formats and divided into slices for identification and padding of invalid elements. The mask mod establishes sets of padded sticks of data in the form of pages of input data for accelerated consumption by the target consumer.

Processing proceeds to step S285, where loop mod 385 applies the mask pattern to subsequent input data. In this example, a loop instruction is received at step S255, where the loop instructions indicate how may datasets are to be processed according to the SAMV instruction for padding invalid elements of input data arranged into uniform data structures. In this way, the single SAMV instruction applies to multiple cycles of mask generation beyond the first input dataset.

Further embodiments of the present invention are discussed in the paragraphs that follow and with reference to FIGS. 4-7.

Some embodiments of the present invention are directed to implementation of a load unit for padding input data while loading sticks of data from a memory or scratch pad store. Some embodiments of the present invention are directed to supporting various element sizes and hierarchical stick layouts.

According to some embodiments of the present invention, the values to replace pad elements are stored in a register file of the load unit during initialization or during runtime.

Some embodiments of the present invention are directed to deriving a mask pattern from layout and pad range parameters encoded within bitfields of an instruction such as an SAMV instruction. The operation of deriving the mask patterns provides for real-time generation of the mask pattern during transfer to a consuming device. Cross-slice and within-slice masking operates to reduce the complexity of mask decoding by the use of coarse-grained (cross-slice) and fine-grained (within-slice) masks. Further, the compact nature of the 6-bit stick data layout scheme assures a small instruction footprint. Hierarchical layouts with both inner and outer dimensions within a slice are supported by the SAMV instruction such that the substitution of pad elements can be controlled to happen along inner and outer dimensions within a slice.

Some embodiments of the present invention are directed to a 6-bit instruction format using two bits for element-size indication, three bits for length indication or innermost dimension, and one bit to indicate whether the innermost dimension is of the cross-slice type or within-slice type.

According to some embodiments of the present invention, upon execution of a SAMV instruction, the derived mask and replacement value are preserved and applied by all subsequent load instructions to pad sticks accordingly. In that way, some embodiments of the present invention allow for intra-stick padding to be performed on the fly without any software overhead other than one "SAMV instruction" for setting up the padding rules for all subsequent loads. Further, because the pad region is defined in elements rather than in bytes, the precision of the workload can be changed without changing the pad region definition.

Figure 4:
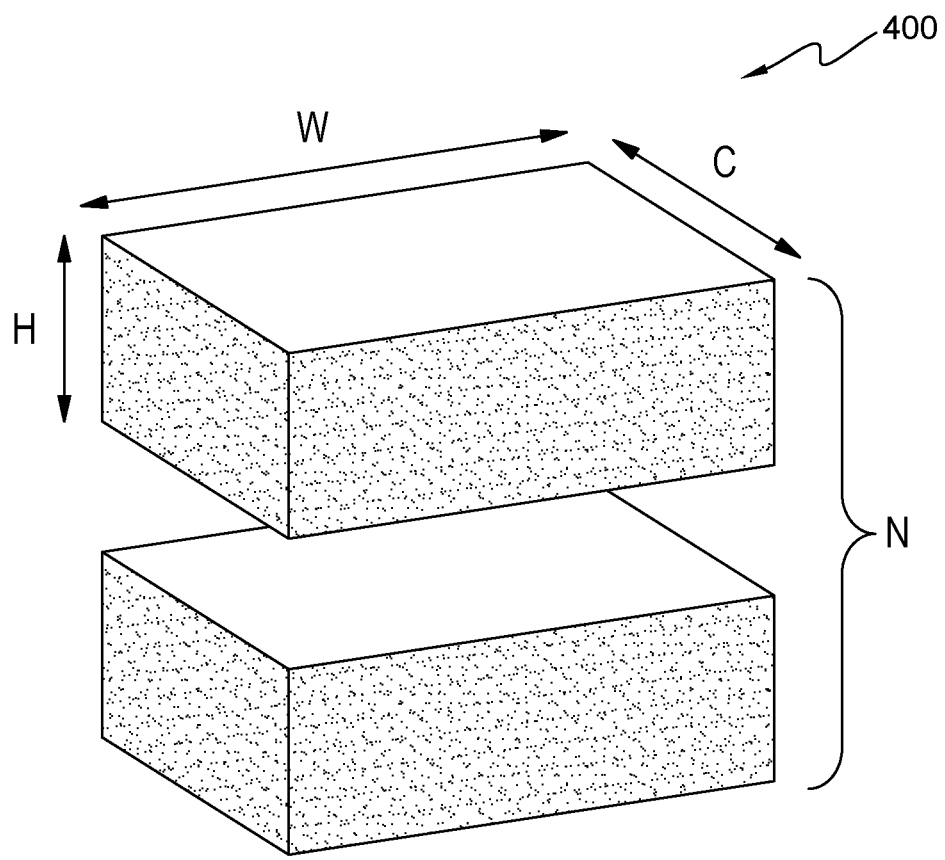
FIG. 4 is a 4D tensor diagram view showing information that is generated by and/or helpful in understanding embodiments of the present invention.

FIG. 4 illustrates 4D tensor 400 representing input data elements having certain characteristics, or dimensions, including height, H; width, W; channels, C; and batch size, N. In this example the values shown in Table 1 are assigned to the dimensions:

TABLE 1

Original 4D Tensor Dimensions.

| BATCH SIZE, N | HEIGHT, H | WIDTH, W | CHANNELS, C | ELEMENT SIZE, ELSZ |
|---|---|---|---|---|
| 2 | 3 | 150 | 120 | 2 |

The original tensor described in Table 1 is restructured into quantities of pages per dimension according to a hierarchical partition of the data elements. Each page is made up of a memory structure referred to herein as a "stick." In this example, each stick is quantized to 128 bytes and each page is quantized to 32 sticks. Accordingly, most of the pages are full pages 532 in that they are fully utilized with valid elements. A stick may correspond to the width of the data bus and/or the effective SIMD (single instruction, multiple data) width. For example: 64 elements×2 bytes/element=128 bytes.

Due to fractional quantities, the new page structure may contain partial pages 533 at the edges that are not fully utilized. In that case only the utilized sticks shall be loaded. This leads to address gaps 534 at the edges that need to be compensated for a streaming of data.

Figure 5:
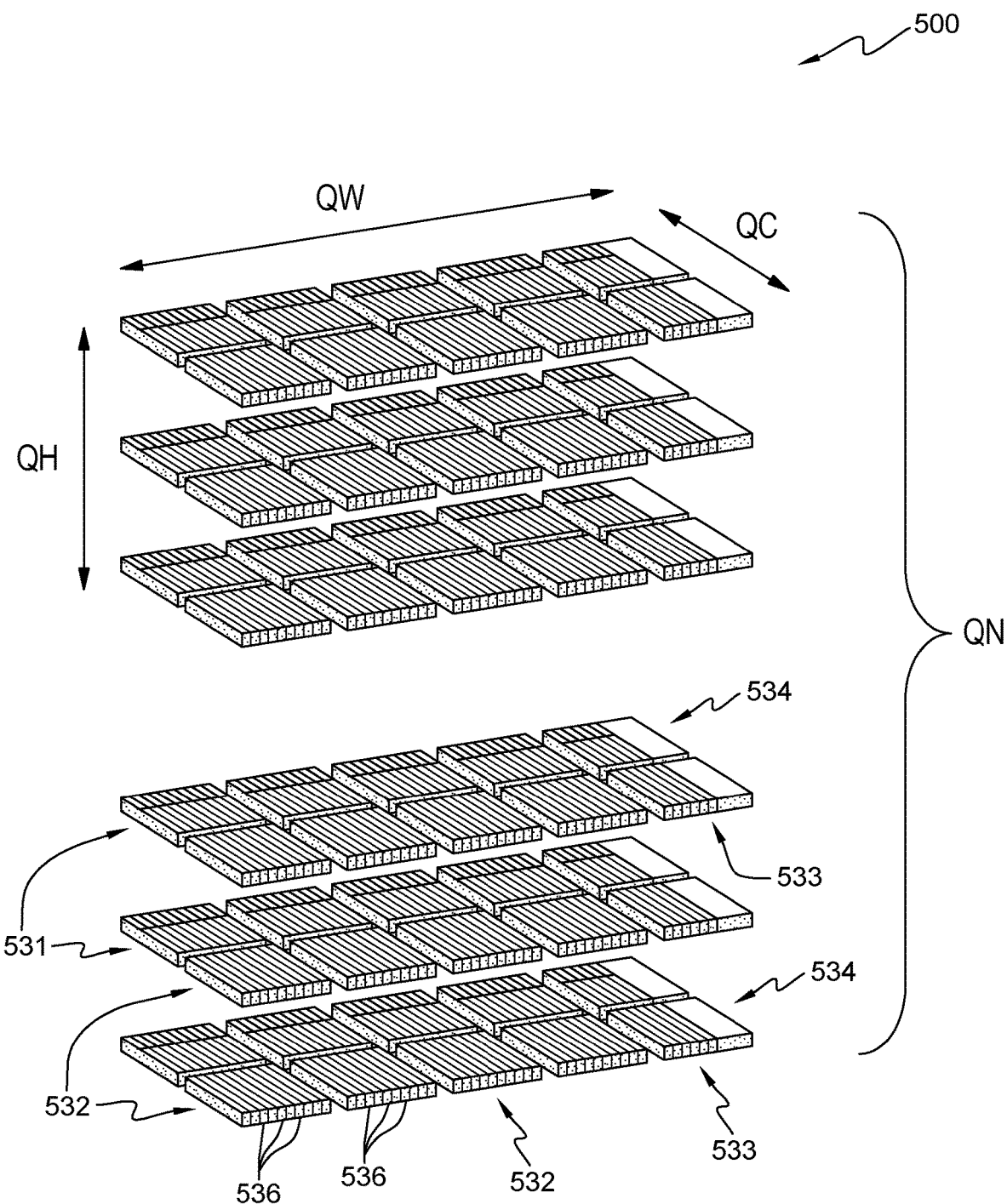
FIG. 5 is a hierarchical diagram view of the 4D tensor showing information that is generated by and/or helpful in understanding embodiments of the present invention.

FIG. 5 illustrates a hierarchical partition of the data elements of FIG. 4 into data components including pages 531, 532, 533 and sticks 536 within each page. The component dimensions, QH, QW, QC, and QN, are derived from the 4D tensor dimensions.

Computation of the component dimensions is illustrated in Table 2.

TABLE 2

Component Dimensions for Partitioned 4D Tensor.

| BATCH SIZE, QN QN = N | CHANNELS, QC QC = ceil (C/64) | HEIGHT, QH QH = H | WIDTH, QW QW = ceil (W/32) | PAGE SIZE, PG_SIZE PG_SIZE = 32*128 |
|---|---|---|---|---|
| 2 | 2 | 3 | 5 | 4096 |

The new data structure resulting in the hierarchal partition may contain empty elements at the edges if the original tensor size in the stick dimension does not evenly divide the 128 bytes of a stick. In this example, where the dimension of interest is the channels, C, the value of C must divide 128 bytes evenly to avoid having empty elements. If there were 128 elements of 2 bytes each (C=128) in the example 4D tensor, there would be no empty elements in the hierarchical partition of the 4D tensor. Data residing at the addresses of apparently empty elements is invalid and should not contribute to the result. Because the SIMD operations operate on the entire stick, any invalid regions need to be padded with suitable values from the register, such as "0" to not change the result value or cause exceptions 531. Referring again to the example, because the value of C is 120 elements, there are 16 bytes of empty elements, or 8 elements that are empty and should be padded prior to processing.

As shown in FIG. 5, many pages are full pages 532 that are fully utilized with valid elements. Other pages include partial sticks 531 or are partial pages 533 having address gaps 534 at the edges. As discussed herein, pages having partial sticks 531 are dynamically padded according to an algorithm carried out during mask operations prior to sending the data volume to a consumer.

It is noted here that the order of the dimensions for a given input tensor may be altered to match the processing order of an accelerator. For example, the original tensor is shown in Table 1 in the order N-H-W-C. Upon restructuring the tensor with reference to pages, the order shown in Table 2 is N-C-H-W, altered from the order of Table 1.

Figure 6:
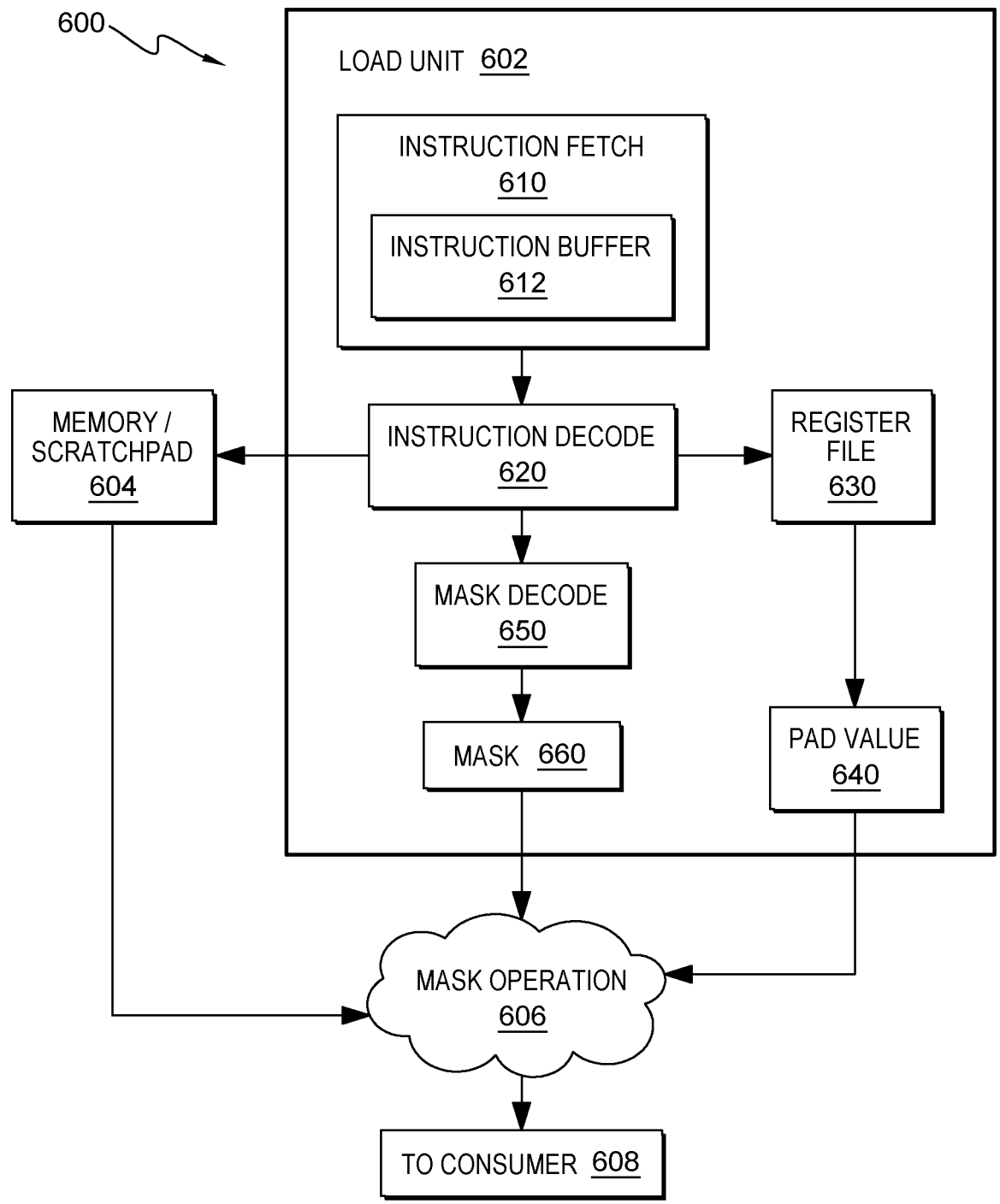
FIG. 6 is a schematic view of a second embodiment of a system according to the present invention.

FIG. 6 illustrates a system for on-the-fly padding on the data path to the consumer logic for single instruction, multiple data (SIMD) parallel processing or for use by an arithmetic logic unit (ALU). The term on-the-fly padding refers to performance of padding, or masking operations, while transferring input data in a suitable data volume for a data consumer. The system of FIG. 6 includes: Load unit sub-system 602; instruction fetch module 610; instruction buffer 612; instruction decode module 620; register file module 630; pad value register 640; mask decode module 650; mask register 660; memory sub-system 604; mask operation sub-system 606; and consumer sub-system 608.

Some embodiments of the present invention are directed to a load unit sub-system containing instruction fetch logic 610 and instruction buffer 612 to execute a program related to memory load operations. Alternatively, the instruction fetch logic is located outside of the load unit sub-system and may be shared with other load unit sub-systems (not shown). The decode logic 620 decodes fetched instructions and generates control signals to register file 630, mask decode 650, and the actual memory block 604.

A set of instructions to perform some embodiments of the present invention may include: (i) load—read data from memory to the consumer; (ii) regcopy—copy an immediate value to register file 630; (iii) SAMV (set active mask value) instruction—sets active mask and value for padding; and (iv) loop—repeat a series of instructions for a given number of times.

As mentioned above, the SAMV instruction is read as part of the instructions for some embodiments of the present invention. The SAMV instruction specifies a mask pattern and selects a pad value from register file 630 to substitute masked elements within a stick and leaves unmasked elements unchanged. Further, the pad value in the register file is stored beforehand, or predefined, and is held in pad value register 640. The SAMV instruction parameterizes the mask decode logic to generate an active mask. The active mask is used by mask operation logic 606 to apply the selected pad value on masked elements of subsequent data read from memory 604. According to some embodiments of the present invention, the instruction decode module and the mask decode module are combined into a single module for decoding. Further, the memory module 604 may reside within the load unit 602.

Mask operation 606 is applied to all memory reads on the data path to the consumer module 608. The mask determines if any elements are replaced by the pad value and which of the identified elements are to be replaced.

Figure 7:
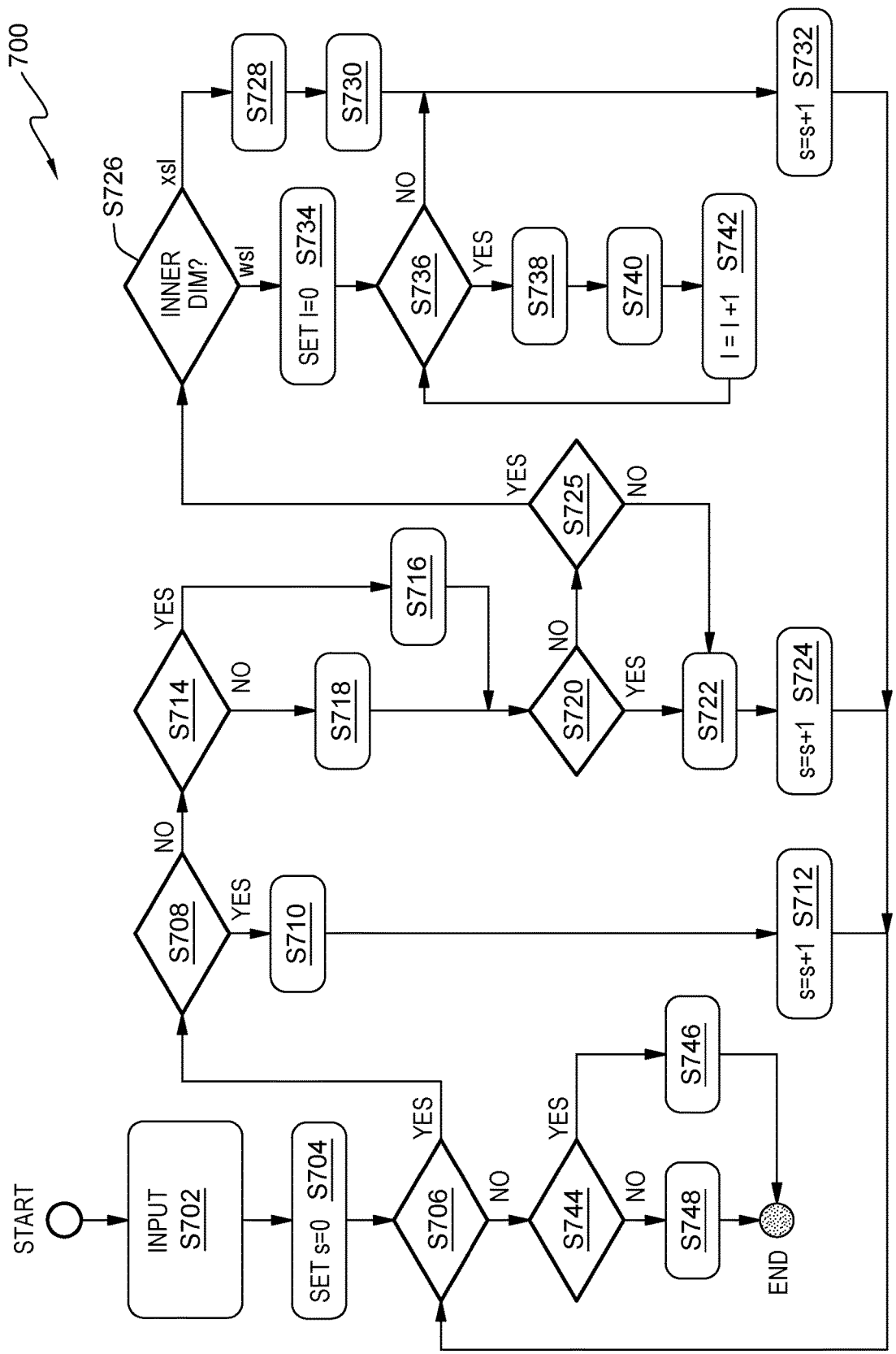
FIG. 7 is a flowchart showing a second method performed, at least in part, by the second embodiment system.

FIG. 7 shows flowchart 700 depicting a second method according to an embodiment of the present invention. FIG. 6 shows system 600 for performing at least some of the method steps of flowchart 700. This method and associated software will now be discussed, over the course of the following paragraphs, with extensive reference to FIG. 7 (for the method step blocks) and FIG. 8 (for the system blocks).

Processing begins at step S702, where data organization within a stick is derived from a 6-bit layout field of a SAMV instruction. The stick organization prescribed by the SAMV instructions includes slice-specific data. Each stick of 128 bytes can be subdivided into slices of 16 bytes where each slice is composed of 2 dimensions, A and B. Eight slices, $X_{xsl}$'2 8, form a stick where the slices are only replicated along a single dimension, $[L_A]$ or $[L_B]$. The dimension present across the slices is a cross-slice dimension, noted as "xsl," and the dimension present only within a slice is a within-slice dimension, "wsl." Accordingly, the data layout within a stick is limited to the following formats:

$\{[X_{xsl}][L_{wsl}][L_{xsl}]\}$ or $\{[X_{xsl}][L_{xsl}][L_{wsl}]\}$.

It should be noted that $X_{xsl}$ is always equal to eight in all data, or number, formats whether FP16, FP8, INT4, or INT2. Also, $L_{wsl}*L_{xsl}=16$ bytes/element-length (element-length being expressed in bytes/element), meaning 8 elements in FP16, 16 elements in FP8, 32 elements in INT4, or 64 elements in INT2.

To specify the data layout in stick, only 6 bits are used. Two bits indicate the data format, one bit indicates whether or not the cross-slice dimension is innermost, $[L_{wsl}][L_{xsl}]$ or $[L_{xsl}][L_{wsl}]$, and three bits to indicate either the length of the cross-slice dimension or the within-slice dimension. It is noted here that the length of the slice dimension uses only three bits because $[L_{xsl}]$ and $[L_{wsl}]$ are a power of two with the choices being {64, 32, 16, 8, 4, 2, 1}. Accordingly, the entry 7 is invalid with the set {6, 5, 4, 3, 2, 1, 0} representing the set {64, 32, 16, 8, 4, 2, 1}.

The hierarchical partition of the data elements shown in FIG. 5 will be referenced in developing the mask generation algorithm that follows. The necessary values are provided as input values by the SAMV instruction for padding.

$X_{xsl}$=sticksz/128=8,
elsz=$2^{1-layout[5:4]}$,
inner_dim=(layout[3]==0)?xsl:wsl
$L_{wsl}=2^{layout[2:0]}$,
$L_{xsl}=128/(elsz*L_{wsl})$, where: sticksz is the specified stick size, such as 128 bytes, and layout refers to the 6-bits layout field in the SAMV instruction (see Table 3, below).

The parameters $SliceID_{xsl}$ and $Valid_{xsl}$ are derived from layout parameters and the number of valid elements, n, in a stick. The layout parameters and the number of valid elements are provided in the SAMV instruction. Derivations are as follows:

$SliceID_{xsl}=\lfloor n*elsz/(16*X_{xsl}) \rfloor$,
$Ceil\_SliceID_{xsl}=\lceil n*elsz/(16*X_{xsl}) \rceil$, and
$Valid_{xsl}=(sliceID_{xsl}==Ceil\_SliceID_{xsl})?L_{wsl}:n \% L_{wsl}$ Processing proceeds to step S704, where the slice count "s" is set to zero. The process for padding invalid elements of a stick begins with a selected stick being "sliced" into a set of slices, such as eight slices in this example. Processing begins with slice zero and ends with slice seven of the 8-slice stick. As will be noted herein, where the input data does not equally divide into sticks, a last stick of the input data arranged into sticks will include invalid data and should be padded. The padding location is automatically identified according to the process described herein such that a portion of a specified slice is flagged for starting the masking, which will carry through to the end of slice number seven, the eighth slice. Processing iterates over the total number of slices through $s=X_{xsl}-1$.

Processing proceeds to decision step S706, where the slice count "s" is compared with the value of $X_{xsl}$ such that when the value of the slice count is equal to the value of $X_{xsl}$, the mask pattern for the stick in question is complete and the masking process follows the "No" branch with mask generation for subsequent mask operations performed, for example, by mask operation module 606 (FIG. 6).

Following the "Yes" branch, processing proceeds to decision step S708, where the current value of the slice count is compared with the value of $SliceID_{xsl}$. The value of $SliceID_{xsl}$ is the slice number where the masking starts. When the $SliceID_{xsl}$ is less than the slice count value, processing follows the "Yes" branch for slices that need to be padded fully, or masked. The $Mask_{xsl}$ value is set to all "1" (S710) indicating masking the corresponding slices and the slice count is incremented by 1 (S712).

Following the "No" branch, processing proceeds to decision step S714 where the value of $Valid_{xsl}$ is compared to the value of $L_{wsl}$. The value of $Valid_{xsl}$ is the element number within a given slice where masking starts. If the two values are equal, processing follows the "Yes" branch for slice or elements of the slice that should be padded fully, or masked. The $Mask_{xsl}$ value is set to all "1" (S716) and processing proceeds to step S720.

Following the "No" branch, processing proceeds to step S718, where the $Mask_{xsl}$ value is set to all "0" indicating the slice or elements in question should not be masked.

Processing proceeds to decision step S720, where the value of $Valid_{xsl}$ is compared to the value zero. If $Valid_{xsl}$ is zero, the elements indicated should not be masked so processing follows the "Yes" branch to set the Mask$_{wsl}$ value to all "0" (S722) and the slice count is incremented by 1 (S724).

Following the "No" branch, processing proceeds to decision step S725, where a decision is made based on the value of s. If s is equal to SliceID$_{xsl}$, the elements indicated should not be masked so processing follows the "No" branch to set the Mask$_{wsl}$ value to all "0" (S722) and the slice count is incremented by 1 (S724).

Following the "Yes" branch, processing proceeds to decision step S726, where the decision is made whether the inner dimension is the within-slice dimension (wsl) or the cross-slice dimension (xsl). If the inner dimension is the within-slice dimension, processing follows the "wsl" branch to set Mask$_{wsl}$ to all "1" (S728) for a specified range of elements in the stick and to set Mask$_{wsl}$ to all "0" (S730) for the remaining range of elements in the stick. Processing proceeds to step S732.

Following the "xsl" branch, processing proceeds to step S734, where the term "1" is set to the value zero.

Processing proceeds to decision step S736, where the value of "1" is compared with the value of L$_{xsl}$. If L$_{xsl}$ is not greater than zero, the first value set for "1," processing follows the "No" branch to step S732. The term "1" is an inner dimension counter with L$_{xsl}$ indicating the number of inner dimensions where the inner dimensions are cross-slice dimensions.

Following the "Yes" branch for L$_{xsl}$ greater than the inner dimension count, zero, processing proceeds to step S738, where Mask$_{wsl}$ is set to all "1" for the range of elements that should be masked and to step S740 where Mask$_{wsl}$ is set to all "0" for the range of elements in the slice that should not be masked.

Processing proceeds to step S742, where the value of 1 is increased by 1.

Processing returns to decision step S736, where the value of L$_{xsl}$ is compared to the revised value of 1 (from step S742), which would be 0+1=1 in the first iteration. If L$_{xsl}$ is greater than 1, processing follows the "No" branch to step S732, otherwise processing returns to set Mask$_{wsl}$ values to 1 (S738) and to 0 (S740) for specified elements of the slice increasing the value of 1 each time by 1 until the value of 1 is greater than the value of L$_{xsl}$, which triggers the process to follow the "No" branch to step S732.

Processing proceeds down the "No" branch to step S732, where the slice counter is increased by 1 and processing returns to decision step S706. Processing continues to follow the "Yes" branch until each slice of the selected stick is processed and the value of the slice counter is equal to the value of X$_{xsl}$, which triggers the process to follow the "No" branch to decision step S744.

Processing proceeds down the "No" branch to decision step S744, where the mask all (MA) value is compared to 1. If the MA value is set to 1, processing follows the "Yes" branch to set the final mask value to all "1" (S746), which causing each element marked 1 during mask patterning to be masked and processing ends.

Following the "No" branch to step S748, processing ends when the final mask pattern is obtained by logical OR-ing the values associated with Mask$_{xsl}$ and Mask$_{wsl}$.

To summarize the process described above, for all eight slices of each stick from slices zero to seven, the cross-slice masks are generated in the following manner. For those slices that should be padded fully the cross-slice mask, Mask$_{xsl}$, is set to "1." For all other slices, the cross-slice mask is set to "0." For the slice where masking starts, SliceID$_{xsl}$, the within-slice mask is generated in the following manner. If the innermost dimension is cross-slice type, the least significant bits of the respective within-slice mask portions are set to "0" and the other bits are set to "1." The least significant bits may be identified with the formula: Bit Significance Measure=elsz*Valid$_{xsl}$. Where the innermost dimension is within-slice, then for all cross-slice dimension sub-slices, the least significant bits of the respective within-slice mask portions are set to "0" and the others are set to "1." For all other slices, the respective within-slice mask portions are set to "0."

Some embodiments of the present invention are directed to a masking instruction format under 32 bits, such as one shown in Table 3, that provides for deriving a masking format from the provided information. An example instruction format operates to mask the most significant elements of a stick starting with element n. SliceID$_{xsl}$ is the slice number where the masking starts based on n. Valid$_{xsl}$ is the element number within SliceID$_{xsl}$ where the masking starts. A value of zero denotes that no masking of all 8 elements is performed. The term MA (mask all) is set to one to mask all elements of the stick. REGFILE[msk_src] is used as a 16-bit value to replace the masked elements.

TABLE 3

Example SAMV Masking Instruction.

| Reserve | Layout | msk_src | Valid-Xsl | SliceID-Xsl | MA | OPCODE |
|---------|--------|---------|-----------|-------------|-----|--------|
| 31:25   | 24:19  | 18:16   | 15:10     | 9:7         | 6   | 5:0    |

For example with reference to the number format FP16, X$_{xsl}$=8, L$_{xsl}$=1, and the cross-slice (xsl) is not innermost in the slice, that is the slice layout is {[X$_{xsl}$][L$_{xsl}$][L$_{wsl}$]}, where "xsl" refers to cross-slice direction and "wsl" refers to within-slice direction. Calculations are as follows:

$$L_{xsl}*L_{wsl}=8,$$

$$L_{wsl}=8$$

For a width of 43 elements:

SliceID_Xsl=43/8=5,

Valid_Xsl=43% 8=3 (Zero would be interpreted as eight—No masking)

An exemplary pseudo program follows for using a SAMV instruction to load a NCHW=1×1×64×43 tensor with W=43 being the stick dimension, arranged with 64 sticks and 64 elements, padding the invalid elements with 0x3e00.

0: regcopy(imm=0x3e00, index=0)

1: SAMV(layout=0v110011, msk_src=0, Valid_Xsl=0b000011, SliceID_Xsl=0b101, MA=0)

2: loop(i=0; i<64; i++)

{

3: load(mem[i])

}

An example mask pattern generated according to the above pseudo program and example 1×1×64×43 tensor is shown in Table 4.

TABLE 4

Example Mask Pattern.

| SLICE 7 | SLICE 6 | SLICE 5 | | SLICE 4 | SLICE 3 | SLICE 2 | SLICE 1 | SLICE 0 |
|---|---|---|---|---|---|---|---|---|
| {<16BX8: '1'>} | {<16BX8: '1'>} | {<16BX8: '1'>} | {<16BX3: '0'>} | {<16BX8: '0'>} | {<16BX8: '0'>} | {<16BX8: '0'>} | {<16BX8: '0'>} | {<16BX8: '0'>} |
| [63]...[56] | [55]...[48] | [47]...[43] | [42]...[40] | [39]...[32] | [31]...[24] | [23]...[16] | [15]...[8] | [7]...[0] |
| MASKED | | | | UNMASKED | | | | |

Some embodiments of the present invention are directed to on-the-fly padding of data from a first set of data into a first data volume (format, called stick) for performance and code path improvement, with a computer system having at least one central processing unit (CPU); having at least one storage associated with the at least one CPU; having at least one Artificial Intelligence (AI) accelerator unit (AU) associated with the at least one CPU; and having a load unit (LU) which pads the first set of data while it loads the first set of data from the at least one storage into a first data volume (format) (called stick). The process may include: (i) storing a set of values in a register file (RF) of the LU during initialization or during runtime based on parameters associated with the first set of data; (ii) specifying a mask pattern with an instruction called SAMV (SetActiveMask&Value) for the first data volume (format); (iii) selecting a set of values from the register file for substituting masked elements within the first data volume (format/stick); (iv) leaving the unmasked elements of the first data volume (format/stick) unchanged; (v) preserving, after the occurrence of a SAMV instruction, the derived mask and the associated substituting set of values; and (vi) applying the derived mask and the associated substituting values by all subsequent equivalent load instructions to pad data from a first set of data to the first data format/sticks accordingly.

According to some embodiments of the present invention, mask patterns are not directly specified but derived from layout and pad range parameters encoded within bitfields of the SAMV instruction.

According to some embodiments of the present invention, combined cross-slice (xsl) and within-slice (wsl) masking is used to reduce mask decoding complexity by coarse-grained and fine-grained masks respectively.

Some embodiments of the present invention are directed to a compact 6-bit stick data layout encoding utilizing 2 bits for element-size indication, 3 bits for length indication of innermost dimension, and 1 bit to indicate whether innermost dimension is cross-slice or within-slice. This supports hierarchical layouts with inner and outer dimensions within a slice. Thus, the substitution of pad elements can be controlled to happen along inner or outer dimension within a slice.

Some embodiments of the present invention specify a mask pattern based on compact layout and range parameters in a SAMV instruction.

Some embodiments of the present invention are directed to selecting a set of values from the register file for substituting masked elements while leaving unmasked elements unchanged.

Some embodiments of the present invention are directed to preserving, after the occurrence of an SAMV instruction, the derived mask and applying the derived mask and the associated substituting values by all subsequent equivalent load instructions to pad data on the fly.

According to some embodiments of the present invention, the input data can be padded with different values based on the different processing steps, e.g. for logsoftmax in the softmax step the padding value would be the smallest representable number while in the log step it would be 0. (Note: the term(s) "LOGSOFTMAX" and/or "SOFTMAX" may be subject to trademark rights in various jurisdictions throughout the world and are used here only in reference to the products or services properly denominated by the marks to the extent that such trademark rights may exist.)

Some embodiments of the present invention are directed to storing pad values in a register file (RF).

Some embodiments of the present invention add performance benefits by padding on the fly without the need to store the padded data.

Some embodiments of the present invention may include one, or more, of the following features, characteristics and/or advantages: (i) adds a higher flexibility in terms of data formats and support also 2D padding patterns; (ii) when providing a mixed software and hardware product, embodiments of the present invention could very likely be more area efficient than conventional solutions; (iii) the padding process costs no extra time, so performance is enhanced; (iv) the compact layout of the encoding eliminates the need to store explicit data structure for masks in memory; (v) versatile masking patterns can be implicitly defined with very few bits suitable for short instruction formats; (vi) does more than add padding in a preprocessing step and stores the padded vectors to a second memory; (vii) applies padding on the fly while loading data to the consumers; (viii) does more than padding based on a padding replacement table and a mask table; (ix) synthesizes the padding mask online based on compact layout and range parameters that fit in a short instruction; (x) application of on-the-fly padding is not limited to convolution, but has broader uses; and/or (xi) reduces complexity and area for providing instructions.

Some helpful definitions follow:

Present invention: should not be taken as an absolute indication that the subject matter described by the term "present invention" is covered by either the claims as they are filed, or by the claims that may eventually issue after patent prosecution; while the term "present invention" is used to help the reader to get a general feel for which disclosures herein that are believed as maybe being new, this understanding, as indicated by use of the term "present invention," is tentative and provisional and subject to change over the course of patent prosecution as relevant information is developed and as the claims are potentially amended.

Embodiment: see definition of "present invention" above—similar cautions apply to the term "embodiment."

and/or: inclusive or; for example, A, B "and/or" C means that at least one of A or B or C is true and applicable.

User/subscriber: includes, but is not necessarily limited to, the following: (i) a single individual human; (ii) an artificial intelligence entity with sufficient intelligence to act as a user or subscriber; and/or (iii) a group of related users or subscribers.

Module/Sub-Module: any set of hardware, firmware and/or software that operatively works to do some kind of function, without regard to whether the module is: (i) in a single local proximity; (ii) distributed over a wide area; (iii) in a single proximity within a larger piece of software code; (iv) located within a single piece of software code; (v) located in a single storage device, memory or medium; (vi) mechanically connected; (vii) electrically connected; and/or (viii) connected in data communication.

Computer: any device with significant data processing and/or machine readable instruction reading capabilities including, but not limited to: desktop computers, mainframe computers, laptop computers, field-programmable gate array (FPGA) based devices, smart phones, personal digital assistants (PDAs), body-mounted or inserted computers, embedded device style computers, application-specific integrated circuit (ASIC) based devices.

What is claimed is:

1. A method for padding data while loading data from a memory to a data consumer, the method comprising:
receiving a load instruction including a padding instruction and a read instruction to read input data arranged in a stick layout from a memory to a data consumer, the padding instruction including a replacement value for masked elements and padding parameters;
deriving a mask pattern from parameters specified in the padding instruction;
padding the input data by masking invalid elements of the stick layout; and
generating a set of data sticks including the padded data for the data consumer.

2. The method of claim 1, wherein the parameters specified in the padding instructions include layout parameters and pad range parameters.

3. The method of claim 1, further comprising:
responsive to the load instruction, transmitting the set of data sticks to the data consumer.

4. The method of claim 1, further comprising:
decoding the padding instructions to determine the replacement value and the mask pattern.

5. The method of claim 1, wherein:
the stick layout is separable into a predefined number of slices, and
masking the invalid elements includes:
identifying invalid slices in a stick, the invalid slices including an invalid element, and
determining a starting slice having a portion of valid elements and a portion of invalid elements.

6. The method of claim 1, wherein the padding instruction provides a specified data format in a 6-bit instruction including data format, cross-slice dimension type, and a key dimension of a stick.

7. The method of claim 1, wherein the stick layout in which the input data is arranged is a pre-determined size matching an SIMD (single instruction, multiple data) capacity of an accelerator performing the deriving and padding steps.

8. A computer program product comprising a computer-readable storage medium having a set of instructions stored therein which, when executed by a processor, causes the processor to perform a method comprising:
receiving a load instruction including a padding instruction, the load instruction including a read instruction to read input data arranged in a stick layout from a memory to a data consumer, the padding instruction including a replacement value for masked elements and padding parameters;
deriving a mask pattern from parameters specified in the padding instruction;
padding the input data by masking invalid elements of the stick layout; and
generating a set of data sticks including the padded data for the data consumer.

9. The computer program product of claim 8, wherein the parameters specified in the padding instructions include layout parameters and pad range parameters.

10. The computer program product of claim 8, further causing the processor to perform a method comprising:
responsive to the load instruction, transmitting the set of data sticks to the data consumer.

11. The computer program product of claim 8, further causing the processor to perform a method comprising:
decoding the padding instructions to determine the replacement value and the mask pattern.

12. The computer program product of claim 8, wherein:
the stick layout is separable into a predefined number of slices, and
masking the invalid elements includes:
identifying invalid slices in a stick, the invalid slices including an invalid element, and
determining a starting slice having a portion of valid elements and a portion of invalid elements.

13. The computer program product of claim 8, wherein the padding instruction provides a specified data format in a 6-bit instruction including data format, cross-slice dimension type, and a key dimension of a stick.

14. A computer system for padding data while loading data from a memory to a data consumer, the computer system comprising:
a processor set; and
a computer readable storage medium;
wherein:
the processor set is structured, located, connected, and/or programmed to run program instructions stored on the computer readable storage medium; and
the program instructions which, when executed by the processor set, cause the processor set to perform a method comprising:
receiving a load instruction including a padding instruction, the load instruction including a read instruction to read input data arranged in a stick layout from a memory to a data consumer, the padding instruction including a replacement value for masked elements and padding parameters;
deriving a mask pattern from parameters specified in the padding instruction;
padding the input data by masking invalid elements of the stick layout; and
generating a set of data sticks including the padded data for the data consumer.

15. The computer system of claim 14, wherein the parameters specified in the padding instructions include layout parameters and pad range parameters.

16. The computer system of claim 14, further causing the processor set to perform a method comprising:
responsive to the load instruction, transmitting the set of data sticks to the data consumer.

17. The computer system of claim 14, further causing the processor set to perform a method comprising:
decoding the padding instructions to determine the replacement value and the mask pattern.

18. The computer system of claim 14, wherein:
the stick layout is separable into a predefined number of slices, and masking the invalid elements includes:
    identifying invalid slices in a stick, the invalid slices including an invalid element, and
    determining a starting slice having a portion of valid elements and a portion of invalid elements.

19. The computer system of claim 14, wherein the padding instruction provides a specified data format in a 6-bit instruction including data format, cross-slice dimension type, and a key dimension of a stick.

20. A computer-implemented method comprising:
    decoding a padding instruction to determine a replacement pad value and padding parameters of a mask pattern for a set of stickified input data, the padding instruction embedded in a first load instruction for the stickified input data;
    deriving a mask pattern from the padding parameters; and
    applying the derived mask pattern and the associated replacement pad value to a subsequent load instruction to load subsequent input data, the subsequent load instruction equivalent to the first load instruction, the subsequent input data is padded during transmission to a requesting consumer.

21. The method of claim 20, wherein the set of stickified input data is arranged as sticks, each stick being separable into pre-defined number of slices.

22. The method of claim 21, further comprising:
    padding the set of stickified input data to generate the set of data sticks by masking invalid elements of each stick, the masking invalid elements of a stick including:
        identifying invalid slices in the stick, the invalid slices including an invalid element, and
        determining a starting slice having a portion of valid elements and a portion of invalid elements.

23. The method of claim 20, wherein the replacement pad value is determined with reference to a pad value register file.

24. The method of claim 20, further comprising:
    generating a set of data sticks from the set of stickified input data for a requesting consumer, the set of data sticks padded according to the derived mask pattern including the replacement pad value.

\* \* \* \* \*